(12) United States Patent
Vora

(10) Patent No.: US 7,373,598 B2
(45) Date of Patent: May 13, 2008

(54) METHOD AND APPARATUS FOR FACILITATING GLOBALIZATION OF VOICE APPLICATIONS

(75) Inventor: Ashish Vora, Naperville, IL (US)

(73) Assignee: Oracle International Corporation, Redwood Shores, CA (US)

( * ) Notice: Subject to any disclaimer, the term of this patent is extended or adjusted under 35 U.S.C. 154(b) by 467 days.

(21) Appl. No.: 10/449,243

(22) Filed: May 29, 2003

(65) Prior Publication Data

US 2004/0139388 A1    Jul. 15, 2004

Related U.S. Application Data

(60) Provisional application No. 60/449,078, filed on Feb. 21, 2003, provisional application No. 60/446,145, filed on Feb. 10, 2003, provisional application No. 60/440,309, filed on Jan. 14, 2003.

(51) Int. Cl.
*G06F 15/00* (2006.01)
*G06F 17/00* (2006.01)
*G06F 17/28* (2006.01)
*G06F 17/20* (2006.01)

(52) U.S. Cl. ............ 715/513; 715/500.1; 715/523; 715/530; 715/536; 704/2; 704/8

(58) Field of Classification Search ............ 715/500.1, 715/513, 526, 530, 536; 704/8, 2
See application file for complete search history.

(56) References Cited

U.S. PATENT DOCUMENTS

| | | | |
|---|---|---|---|
| 6,904,401 B1* | 6/2005 | Hauduc et al. ............... | 704/8 |
| 7,134,075 B2* | 11/2006 | Hind et al. ............... | 715/513 |
| 2002/0083100 A1* | 6/2002 | Sakai ............... | 707/522 |
| 2002/0147964 A1* | 10/2002 | Cutler et al. ............... | 717/120 |
| 2002/0162093 A1* | 10/2002 | Zhou et al. ............... | 717/130 |
| 2002/0188451 A1* | 12/2002 | Guerra et al. ............... | 704/270 |
| 2003/0140316 A1* | 7/2003 | Lakritz ............... | 715/536 |
| 2004/0030554 A1* | 2/2004 | Boxberger-Oberoi et al. .... | 704/260 |
| 2004/0122659 A1* | 6/2004 | Hourihane et al. ............ | 704/9 |
| 2004/0128342 A1* | 7/2004 | Maes et al. ............... | 709/200 |

FOREIGN PATENT DOCUMENTS

EP    0 964 566 A    12/1999    ............ 3/50

OTHER PUBLICATIONS

IBM Technical Disclosure Bulletin, Oct. 1995, US, vol. #38, Issue #10, pp. 461-462, "Language Independent Interfaces for Locale Definition and Creation".*

(Continued)

*Primary Examiner*—Rachna Singh
(74) *Attorney, Agent, or Firm*—Park, Vaughan & Fleming LLP

(57) ABSTRACT

One embodiment of the present invention provides a system that generates voice output for an application. During operation, the system receives a symbolic representation of data to be outputted from the application, wherein the symbolic representation is locale-independent. The system also obtains a locale attribute that identifies a version of a language that is spoken in the locale. Next, the system expands the symbolic representation into a fully articulated locale-specific textual representation of the data, and then associates the textual representation with one or more audio files containing locale-specific voice output corresponding to the textual representation.

25 Claims, 5 Drawing Sheets

OTHER PUBLICATIONS

Kataoka, Yutaka, et al. "A Model for Input and Output of Multilingual Text in a Windowing Environment", ACM Transactions on Information Systems, vol. 10, No. 4, Oct. 1992, pp. 438-451.*

Smart Phone Today, "Web Based Mobile Application Workshop Launched", Published: Dec. 5, 2000, pp. 1-3, Available on the WWW at: http://www.smartphonetoday.com/articles/2000/12/2000-12-5-Web-Based-Mobile.html.*

Technology Reports, "Multi-Channel Access XML (MAXML)", Published: Jan. 6, 2001, pp. 1-5, Available on the WWW at: http://xml.coverpages.org/maxml.html.*

VoiceXML Forum, "Voice extensible Markup Language VoiceXML" Version 1.00, Mar. 7, 1000, pp. 1-209.*

Niklfeld, Georg, et al. "Component-based multimodal dialog interfaces for mobile knowledge creation", pp. 1-8, published Jul. 2001.*

Publication: "e-business Globalization Solution Design Guide—Getting Started", by Xiao Hui Zh et al., Online, Dec. 2002, IBM Redbooks, X002283136, http://www.redbooks.ibm.com/redbooks/pdfs/sg246851.pdf>, figures 3-1.

Publication: "SSML: A speech synthesis markup language" by Paul Taylor and Amy Isard, Speech Communication, Elsevier Science Publishers, Amsterdam, NL., vol. 21, No. 1, Feb. 1, 1997, pp. 123-133, XP004055059, ISSN: 0167-6393, whole document.

Publication: "A Multilingual Text Processing Engine for the Papageno Text-to-Speech Synthesis System", by Matej Rojc et al., 6th European Conference on Speech Communication and Technology Eurospeech 1999, vol. 5, Sep. 5, 1999, pp. 2107 to 2110, XP007001426, Budapest, Hungary, whole document.

Publication: "IBM WebSphere Developer Technical Journal: A Globalization Solution for a Web-based Voice Application—Using a Websphere Voice Server Deployment Structure" by Yi Zhen Xu, IBM Websphere Developer Technical Journal, Online, Jan. 15, 2003, XP002283134, http://www-106.ibm.com/developerworks/websphere/techjournal/0301_xu/xu.html>, whole document.

Publication: "Evaluation of Intelligent Component Technologies for VoiceXML Applications" by Markus Mittendorfer et al., Technical Report SCCH-TR, FTW Technical Report, online, XP002283135, http://speech.ftw.at/download/EvalVoiceXML.pdf>.

Publication: "CSS and Artwork Globalization", IBM Redbooks, e-Business Globalization Solution Design Guide, IBM Corp. 2002, pp. 163 to 190.

Publication: "What are Web Services:", e-Business Globalization Solution Design Guide, pp. 73 to 162.

Publication entitled "The International Concatenation Coding Generator for Perfect Playback of Voice Prompts and Text in 200 Languages", International Services, May 7, 2002, http://www.internationalservices.com/press/prodrelease1.html.

* cited by examiner

METHOD AND APPARATUS FOR FACILITATING GLOBALIZATION OF VOICE APPLICATIONS

RELATED APPLICATION

This application hereby claims priority under 35 U.S.C. §119 to U.S. Provisional Patent Application No. 60/440,309, filed on 14 Jan. 2003, entitled "Concatenated Speech Server," by inventor Christopher Rusnak, and to U.S. Provisional Patent Application No. 60/446,145, filed on 10 Feb. 2003, entitled "Concatenated Speech Server," by inventor Christopher Rusnak. This application additionally claims priority under 35 U.S.C. §119 to U.S. Provisional Patent Application No. 60/449,078, filed on 21 Feb. 2003, entitled "Globalization of Voice Applications," by inventors Ashish Vora, Kara L. Sprague and Christopher Rusnak.

This application is additionally related to Non-provisional Patent Application No. 10/449,203 entitled, "Structured Datatype Expansion Framework," by inventors Ashish Vora, Kara L. Sprague and Christopher Rusnak filed on the same day as the instant application.

This application is also related to a Non-provisional Patent Application No. 10/449,201 entitled, "Method and Apparatus for Using Locale-Specific Grammars for Speech Recognition," by inventor Ashish Vora filed on the same day as the instant application.

BACKGROUND

1. Field of the Invention

The present invention relates to voice interfaces for computer systems. More specifically, the present invention relates to a method and an apparatus that facilitates globalizing voice applications.

2. Related Art

Globalization of software applications is emerging as a business necessity in today's increasingly interconnected marketplace. This interconnectedness, coupled with a soft economy, provides a valuable opportunity for companies that can efficiently and effectively provide their software to the largest audience. Far too often, globalization is an afterthought in the application development cycle—composed of ad hoc processes and frameworks grafted onto the final stages of the implementation process. Companies that undertake a globalization effort in this ad hoc fashion are likely to rewrite their applications for each language, or worse, fail to ship software in multiple languages altogether.

Nowhere is this more evident than in the speech technology world. The unique challenges posed by voice application development are daunting even for single-language development. Adding multiple languages to the mix and trying to maintain the ideal of a single code base and simultaneous shipment for all languages only makes the task harder. A variety of methods and processes exist to facilitate globalization of screen-based applications, but unfortunately, these methods and processes fall short (on their own) to address the needs of voice applications developers.

Hence, what is needed is a completely new voice globalization framework to help mitigate the complexity associated with these tasks.

SUMMARY

One embodiment of the present invention provides a system that generates voice output for an application. During operation, the system receives a symbolic representation of data to be outputted from the application, wherein the symbolic representation is locale-independent. The system also obtains a locale attribute that identifies a version of a language that is spoken in the locale. Next, the system expands the symbolic representation into a fully articulated locale-specific textual representation of the data, and then associates the textual representation with one or more audio files containing locale-specific voice output corresponding to the textual representation.

In a variation on this embodiment, the system also outputs the audio files to a user. This can involve sending references to the audio files from an application server to a voice gateway, and then allowing the voice gateway to output the audio files to the user.

In a variation on this embodiment, upon receiving a voice input from the user, the system interprets the voice input using a locale-specific grammar.

In a variation on this embodiment, the locale attribute can be encoded in any one of a number of different application markup languages, such as HTML, XML, WML and MXML.

In a variation on this embodiment, the locale attribute is encoded in a Voice eXtensible Markup Language (VoiceXML) document that contains a locale-independent representation of how voice output is to be presented to a user. It also contains a locale-independent representation of how a voice input is to be received from the user.

In a variation on this embodiment, obtaining the locale attribute involves receiving the locale attribute as an application parameter, possibly associated with a particular user.

In a further variation, the VoiceXML document is obtained by translating a Multi-channel eXtensible Markup Language (MXML) document into the VoiceXML document, wherein the MXML document can also be translated into other markup languages, such as HyperText Markup Language (HTML).

In a variation on this embodiment, associating the textual representation of the data with the audio files involves matching the largest possible substrings of the textual representation with corresponding audio files from a library.

In one embodiment of the present invention, the locale attribute includes a language code that identifies the language, and a region code that identifies a geographic region in which a locale-specific version of the language is spoken.

One embodiment of the present invention provides a system that facilitates recognizing voice input. During operation, the system receives a document that includes a specification of a datatype for which there exists a predefined grammar. The system also obtains a locale attribute for the datatype, wherein the locale attribute identifies a version of a language that is spoken in a locale. Next, the system uses the locale attribute to lookup a locale-specific grammar for the datatype, and then communicates the locale-specific grammar to a speech recognition engine, thereby allowing the speech recognition engine to use the locale-specific grammar to recognize voice input for the datatype.

In one embodiment of the present invention, the document that includes the specification of the datatype is a Voice extensible Markup Language (VoiceXML) document.

In one embodiment of the present invention, obtaining the locale attribute involves obtaining the locale attribute from the VoiceXML document.

In a variation on this embodiment, the locale attribute is encoded in an MXML document which is used to generate a Voice extensible Markup Language (VoiceXML) document.

In a variation on this embodiment, obtaining the locale attribute involves receiving the locale attribute as an application parameter, possibly associated with a particular user.

In one embodiment of the present invention, the locale-specific grammar identifies a standard set of phrases to be recognized by the speech recognition engine while receiving voice input for the datatype.

In one embodiment of the present invention, the locale-specific grammar associates a phrase that can be spoken with a corresponding semantic meaning.

In one embodiment of the present invention, communicating the locale-specific grammar to the speech recognition engine involves communicating a reference to the speech recognition engine, wherein the reference specifies where the locale-specific grammar can be retrieved from.

In one embodiment of the present invention, communicating the locale-specific grammar to the speech recognition engine involves incorporating the grammar "in-line" into a VoiceXML document, and then communicating the VoiceXML document to the speech recognition engine.

In one embodiment of the present invention, the locale attribute includes a language code that identifies the language, and a region code that identifies a geographic region in which a locale-specific version of the language is spoken.

One embodiment of the present invention provides a system that expands a symbolic representation of a data item into a locale-specific textual representation of the data item. The system operates by first receiving a locale-independent symbolic representation of the data item. Next, the system obtains a locale attribute that identifies a version of a language that is spoken in a locale, and then expands this symbolic representation of the data item into the locale-specific textual representation of the data item.

In a variation of this embodiment, the locale is received along with the data item.

In a further variation, receiving the data item includes receiving expansion attributes for controlling expansion of the data item.

In a further variation, the system selects an expander for expanding the data item. This expander is selected based upon the locale attribute.

In a further variation, the expander accepts the data item, the locale attribute, and the expansion attributes and generates the locale-specific textual representation of the data item as an output.

In a further variation, the locale attribute and the expansion attributes are received as part of a conversion command.

In a further variation, the locale attribute and the expansion attributes are elements of a cascading style sheet.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Transformation Framework

Figure 1:
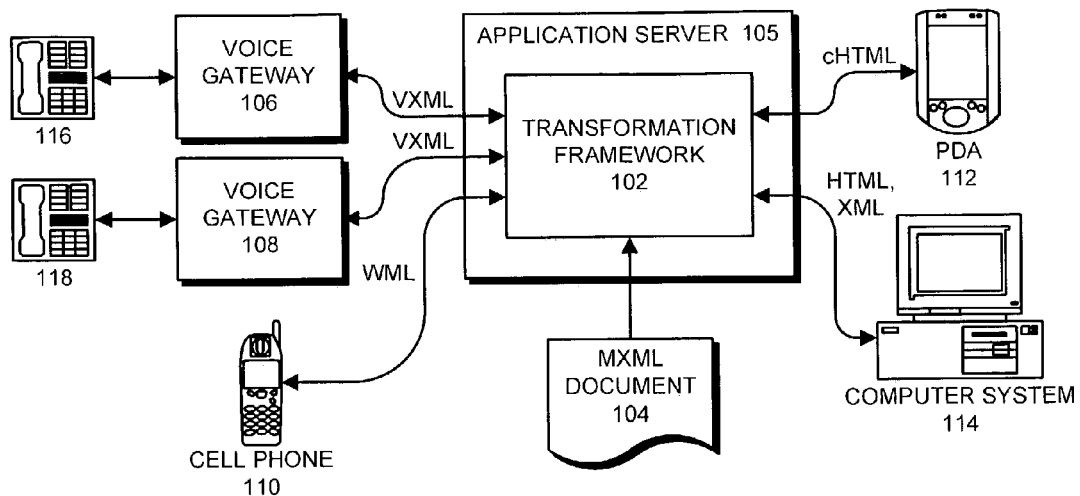
FIG. 1 illustrates a system that provides a transformation framework from an MXML document in accordance with an embodiment of the present invention.

FIG. 1 illustrates a system that provides a transformation framework 102 within an application server 105 in accordance with an embodiment of the present invention. Transformation framework 102 receives a Multi-channel extensible Markup Language (MXML) document 104 and translates the MXML document 104 into other markup languages, such as Hypertext Markup Language (HTML), extensible Markup Language (XML), Wireless Markup Language (WML), and Compact Hypertext Markup Language (cHTML).

These other markup languages can be used to communicate with different devices. For example, VoiceXML can be used to communicate with telephones 116 and 118 through voice gateways 106 and 108, which allow VoiceXML documents to be accessed through telephones 116 AND 118. WML can be used to communicate with wireless devices, such as cell phone 110. cHTML can be used to communicate with handheld devices, such as personal digital assistant (PDA) 112. Finally, HTML and XML can be used to communicate with a standard browser on computer system 114.

Note that a document can be written once in device-independent MXML form. The MXML document can then be translated into device-specific markup languages, such as HTML, XML, WML, HDML and VoiceXML. This can potentially save a considerable amount of programmer time because it is not necessary to write a different version of the application for each different markup language. It can also save on storage space because only a single version of the application needs to be stored.

While translating MXML document 104 into VoiceXML, transformation framework 102 can also facilitate translating a locale-independent symbolic representation of data to be outputted into a locale-specific voice output. This process is described below with reference to FIGS. 2-4. Note that during the translation process, transformation framework 102 can obtain a locale attribute that identifies a version of a language spoken in a particular locale. For example, the locale attribute "en-UK" can specify the version of the English language spoken in the United Kingdom. This locale attribute can then be used to generate a locale-specific voice output.

Note that transformation framework 102 can also receive voice input and can interpret the voice input using a locale-specific grammar.

Voice Gateway

Figure 2:
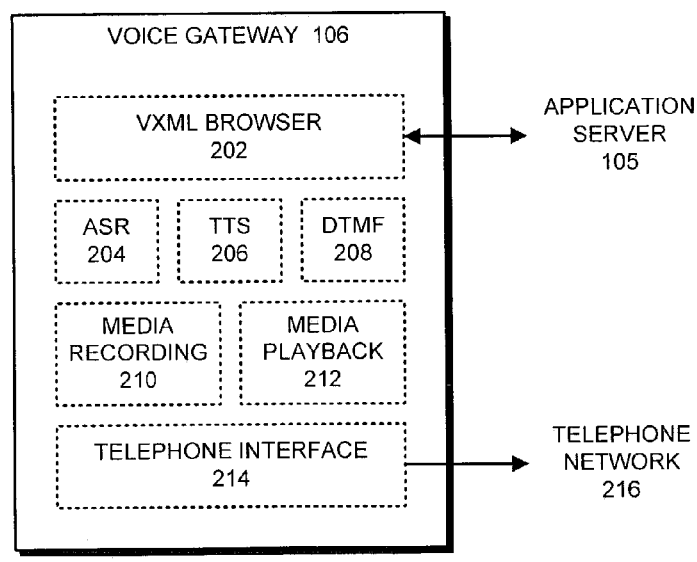
FIG. 2 illustrates a voice gateway in accordance with an embodiment of the present invention.

FIG. 2 illustrates a voice gateway 106 in accordance with an embodiment of the present invention. Voice gateway 106 includes a VoiceXML browser 202, Automated Speech Recognition unit (ASR) 204, Text-To-Speech synthesis (TTS) engine 206, Dual Tone Multi-Frequency (DTMF) unit 208, media recording engine 210, media playback engine 212, and telephone interface 214.

VoiceXML browser 202 renders VMXL pages received from transformation framework 102 within application server 105.

Telephone interface 214 is used to access telephone network 216.

On the input side, ASR 204 recognizes voice input received from a user through telephone interface 214. Additionally, DTMF unit 208 can be used to recognize touchtone telephone signals through telephone interface 214. On the output side, TTS engine 206 converts textual output into a synthesized audio stream, prior to outputting the audio stream through telephone interface 214.

Media recording engine 210 can be used to record audio streams received from a user, while media playback engine 212 can be used to play back audio files for a user.

Voice Output

One challenge encountered by application developers is to output structured data in a format that is understood by users regardless of the locale. Structured data in this context can refer to any of a variety of data types ranging from "primitive datatypes" (i.e. integers, decimals, strings, characters, etc.) to more complex combinations of these "primitive datatypes" (e.g. dates, times, currencies, acronyms, flight numbers, etc.). Typically, each of these data types have some sort of symbolic or iconic representation that allows for abbreviated display in a user interface (UT) and a reduced amount of memory overhead for storage. For example, a simple counting application that needs to display one integer at a time may choose to do so by displaying the iconic value for each integer (1, 2, 3, 4, etc.) rather than the spelling of each integer (one, two, three, four, etc.). However, relying on iconic representations of this data yields several problems.

System developers rely on the user of an application to correctly interpret the iconic value as a particular datatype. For example, consider two different software applications. In the first, a message is visually displayed that reads: "I have 5 socks in my sock drawer." The user is expected to see this and create a mental model of a sock drawer with five (5 as a cardinal number) socks in it. In the second application, a message is visually displayed that reads: "Today is 3/5/2003." In this case (at least for users in the United States), it is quite likely that the user will read this statement as "Today is March fifth (five as an ordinal number), two thousand three." In some cases, the internal representation of the data (5) is the same, but the interpretation of that iconic information varies according to context.

Just as the interpretation of iconic information varies according to context, so too does the interpretation vary according to the cultural conventions of the locale in which the iconic information is being presented. For example, the interpretation of the statement "Today is 3/5/2003." in The United Kingdom will likely be: "Today is the third of May, two thousand three." Here, the same iconic representation of a date in U.S. English and United Kingdom English has two entirely different meanings.

These issues do not pose very drastic problems for a graphical user interface (GUI), because people have been conditioned throughout their lives to associate the visual, iconic representations of numbers and other basic data types with their underlying meaning. However, in other types of user interfaces such as a voice interface, the user does not have the benefit of a graphical display on which an iconic representation is shown. Current text-to-speech converters cannot consistently interpret the input data and provide the proper, locale-specific output to the user that the application developer intended. Instead, the applications are typically rewritten and/or modified for each locale.

Figure 3A:
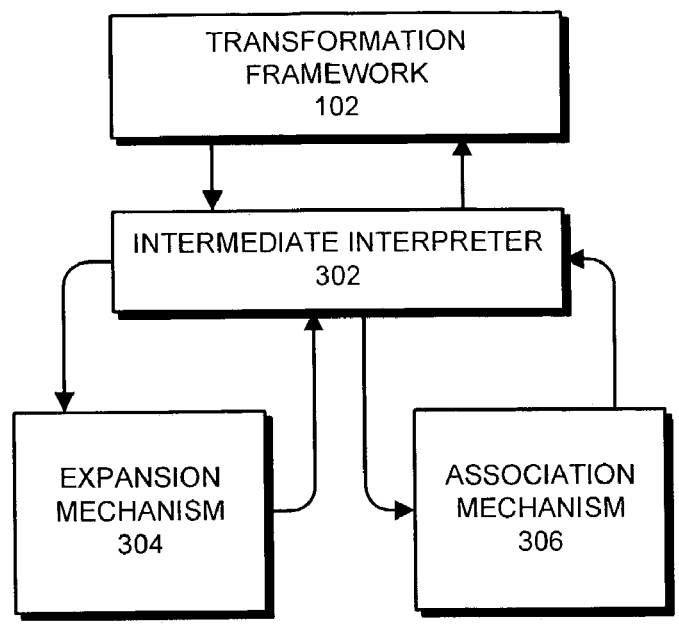
FIG. 3A illustrates mechanisms involved in generating voice output for an application in accordance with an embodiment of the present invention.

The present invention provides a framework for generating a locale-specific voice output for an application in accordance with an embodiment of the present invention. Referring to FIG. 3A, transformation framework 102 feeds data to be outputted into an intermediate interpreter 302. Note that this data to be outputted is in a symbolic form, which is language-independent and locale-independent.

Intermediate interpreter 302 feeds the data through expansion mechanism 304, which expands the data into a fully articulated locale-specific textual representation of the data. For example, if the locale attribute has the value "en-US" for the United States, the date "2003-02-04" (in language-independent ISO standard 8601 format YYYY-MM-DD) can be expanded into fully articulated textual form in US English as "February fourth, two thousand three." On the other hand, if the locale attribute has the value "en-UK" for the United Kingdom, the date "2003-02-04" can be expanded into fully articulated textual form in UK English as "The fourth of February, two thousand three." Note that changing the locale attribute can also cause the date to be translated into fully articulated text in other languages besides English.

After the symbolic representation of the data is expanded into a textual representation, intermediate interpreter 302 feeds it through an association mechanism 306, which associates the textual representation with one or more audio files containing locale-specific voice output corresponding to the textual representation. In doing so, association mechanism 306 attempts to match the largest possible substrings of the textual representation with corresponding audio files from a library. This generally results in the highest possible quality speech output.

Expansion Mechanism

Figure 3B:
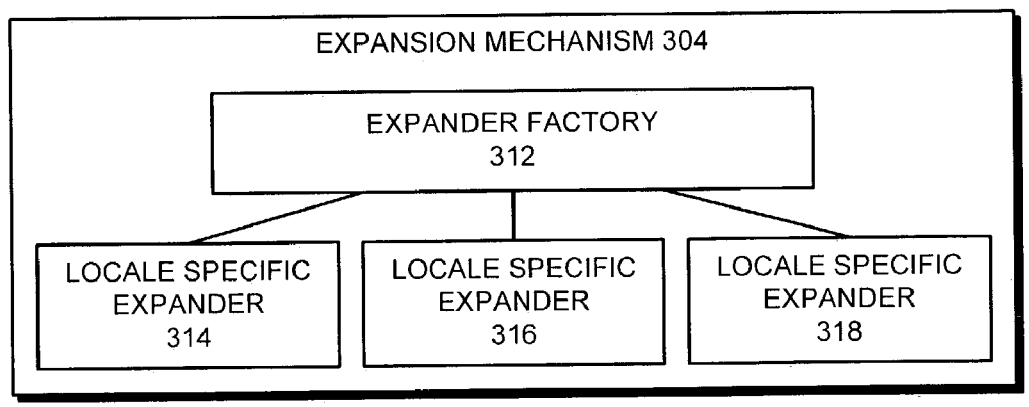
FIG. 3B illustrates an expansion mechanism in accordance with an embodiment of the present invention.

FIG. 3B illustrates an expansion mechanism 304 in accordance with an embodiment of the present invention. Expansion mechanism 304 includes expander factory 312. During operation of the system, expander factory 312 creates a locale-specific expander upon demand for each locale that is involved in a conversion operation. For example, locale specific expanders 314, 316, and 318 are illustrated in FIG. 3B. Note that there can be more of fewer locale specific expanders than are shown in FIG. 3B.

In one embodiment of the present invention, the system includes an application programming interface (API) for the specific language, for example, a JAVA™ API. This API is independent of locale and thus allows an application developer to invoke the API in a consistent manner from an application.

For example, an application programmer may enter the command:

EXPAND(date(3/5/2003), en-US, DMY);

The system determines that the expansion of the data should conform to the US English locale, and should include the date, month, and year fields. If a US English locale specific expander is not currently instantiated, expander factory 312 instantiates locale specific expander 314 to expand data items for the US English locale.

Locale specific expander 314 then expands the date using the rules for expansion of dates in the US English locale and the requested fields. In this case, the date is rendered as: "March fifth, two thousand three." Note that the fields can be used to yield different forms of the date. For example, the field "DaDM" could indicate that the day, date, and month are desired. In this case, the output would be "Wednesday, March fifth." Note also that the order that the fields are listed does not change the order of the output. The order of the output is specified by the locale. If the fields are listed as "MDDa," the output is still "Wednesday, March fifth."

As another example, if the application programmer enters the command:

EXPAND(date(3/5/2003), en-UK, DMY);

the system determines that the expansion of the data should conform to the United Kingdom English locale, and should include the date, month, and year fields. If a United Kingdom English locale specific expander is not currently instantiated, expander factory 312 instantiates locale-specific expander 316 to expand data items for the United Kingdom English locale. The date is then rendered as "The third of May, two thousand three."

As a final example, if the application programmer enters the command:

EXPAND(date(3/5/2003), es-ES, DMY); the system determines that the expansion of the data should conform to the Spanish locale, and should include the date, month, and year fields. If a Spanish locale specific expander is not currently instantiated, expander factory 312 instantiates locale specific expander 318 to expand data items for the Spanish locale. The date is then rendered as "tres de mayo, de dos mil tres."

In another embodiment of the system, entry to the API can be through an invocation from a markup language. For example, the markup language invocation:

<SimpleSpeech say-as="date" locale="en-US" fields="DMY"> would call the API to convert the date into a US English text string including the date, month, and year fields.

In another embodiment, the conversion can be controlled though a cascading style sheet (css) where the locale and fields are pre-specified by the style. A date expansion would then be triggered by:

<css.date>4/2/2003</css>

This date is then expanded using the style sheet's locale and date fields. Note that while the above descriptions are for rendering dates, each locale specific expander includes methods for expanding other forms of iconic information. For example, the cardinal number 1,000,000,000 will be rendered as one billion in US English and as a thousand million in United Kingdom English.

Process of Generating Voice Output

Figure 4:
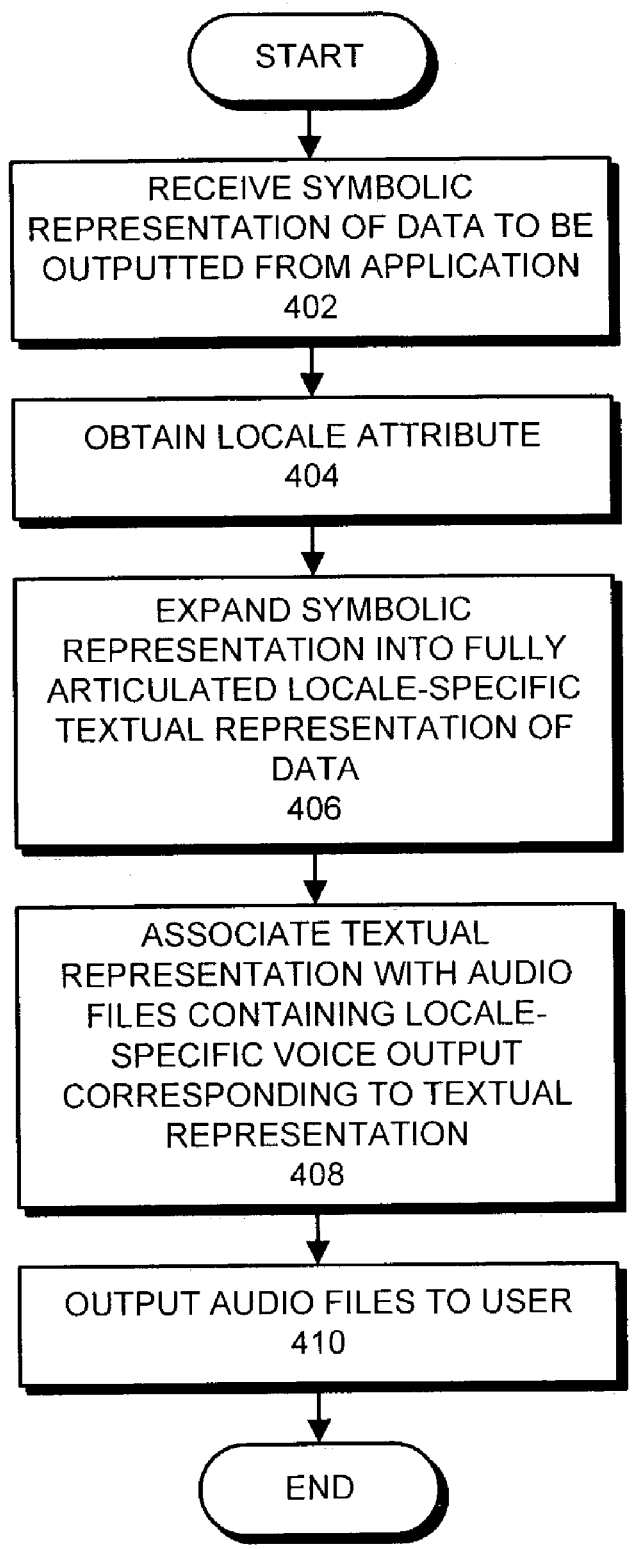
FIG. 4 presents a flow chart illustrating the process of generating voice output in accordance with an embodiment of the present invention.

FIG. 4 presents a flow chart illustrating the process of generating voice output in accordance with an embodiment of the present invention. The system starts by receiving data to be outputted from an application in a language-independent and locale-independent symbolic form (step 402). Next, the system obtains a locale attribute associated with the output (step 404). In one embodiment of the present invention, this locale attribute is encoded as an attribute within a VoiceXML document.

Next, the system feeds the symbolic form of the data into expansion mechanism 304, which expands the data into a fully articulated locale-specific textual representation (step 406).

This fully articulated textual representation then feeds into association mechanism 306, which associates the textual representation of the data with one or more audio files containing locale-specific voice output corresponding to the textual representation (step 408).

Finally, the system causes the audio files to be outputted to the user (step 410). This can be accomplished by sending references to the audio files (or the audio files themselves) from transformation framework 102 to voice gateway 106 (see FIG. 1). This allows voice gateway 106 to play the audio files through media playback engine 212 (see FIG. 2).

Process of Receiving Voice Input

Voice input to an application is typically facilitated through the use of "grammars," which are codified representations of words/phrases/concepts that a user of the application may say to perform some action. There are a variety of different categories that these grammars can fall into—some are application-specific, and as such are defined at the application level by the software developer. These application-specific grammars may themselves fall into one or more categories depending on their behavior.

For example, certain types of grammars can be considered "command and control" since they are grammars that specify a limited number of short command phrases that map to a particular action or concept. These kinds of grammars are often written inline with the rest of the application code. There are also more "conversational" or "natural language" grammars, which allow for a much wider range of user input to be recognized as the same concept. The ostensible benefit of "conversational" grammars over the simpler "command and control" type grammars is that users of the "conversational" interface do not have to learn special commands to interact with the service; indeed, in a well-implemented "conversational" application, the user should be able to speak as freely as if they were speaking with another human being.

Another kind of grammar is not application specific, but rather represents a common set of functionality across many applications. For example, many classes of voice applications require certain basic input capabilities to allow users to enter things like numbers, dates, times, etc. These types of input mechanisms are so common in fact, that the VoiceXML specification identifies a number of these common input mechanisms as "built-in" grammars, which all VoiceXML interpreters need to treat in a consistent way.

The main problem that arises from the VoiceXML built-in grammars is that the VoiceXML specification does not completely specify how the various grammar types are to be handled. In particular, the specification says nothing about the actual set of input phrases that should be matched for any built-in grammar type. Instead, the specification primarily defines the return format that the built-in grammar handlers should send to the application upon matching an utterance. This lack of definition proves to be problematic for two reasons. First, the absence of a defined set of input phrases for each built-in grammar type means that different VoiceXML gateways can accept different sets of input from users, thus undermining the goal of application portability even for a single language. Second, the specification provides little direction about how built-in grammars should deal with other languages, saying simply that "the set of accepted spoken input for each built-in type is platform dependent and will vary by language."

In order to address the various issues raised by voice input internationalization, one embodiment of the present invention provides a standardized set of built-in grammars as part of a Voice Globalization Framework. These grammars fully specify the set of phrases that can be recognized for a particular datatype, thus ensuring consistency of user experience across different VoiceXML gateways. Additionally, the built-in grammars are implemented for each locale, so that consistency is accomplished not just across gateways, but across all locales. Furthermore, the interface to the developer is simple and unified—on any given form field, the developer simply provides attributes pertaining to the "type" of grammar to invoke as well as a locale identifier.

Figure 5:
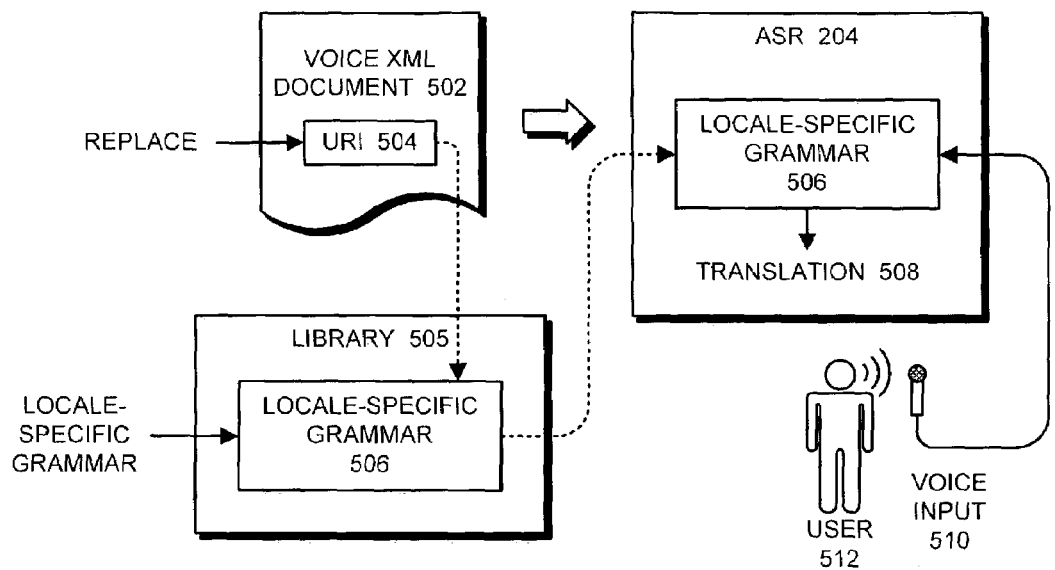
FIG. 5 illustrates the process of receiving voice input in accordance with an embodiment of the present invention.

FIG. 5 illustrates the process of receiving voice input in accordance with an embodiment of the present invention. While constructing a VoiceXML document 502, transformation framework 102 (from FIG. 1) replaces a specifier for a datatype with a Uniform Resource Identifier (URI) 504, which can be used to determine a location for a locale-specific grammar 506 in library 505. Note that library 505 can include a number of different locale-specific grammars for each datatype.

Next, transformation framework 102 sends VoiceXML document 502 to Automated Speech Recognition unit (ASR) 204 within voice gateway 106 (see FIG. 2). This causes ASR 204 to load locale-specific grammar 506 from library 505. ASR 204 then uses locale-specific grammar 506 to interpret a voice input 510 from a user 512. This results in a translation 508 of voice input 510 into a symbolic form for the associated datatype.

Note that if locale-specific grammar 506 is small enough, locale-specific grammar 506 can be inserted "in-line" into VoiceXML document 502. This eliminates the need for ASR 204 to load locale-specific grammar 506 from library 505.

In one embodiment of the present invention, the locale-specific grammar 506 identifies a standard set of phrases to be recognized by the speech recognition engine while receiving voice input for the datatype. In particular, a given locale-specific grammar can associate one or more phrases that can be spoken with a corresponding semantic meaning. For example, a grammar can associate the phrases "goodbye," "exit," "see ya," "log off" and "later" with a command to exit from a program.

In an effort to standardize grammars for speech recognition, a number of gateway providers have developed systems that adhere to the Speech Recognition Grammar Specification (SRGS) standard. Unfortunately, there are many inconsistencies between different voice gateway implementations of the SRGS standard. In order to remedy this problem, one embodiment of the present invention uses a common subset of SRGS, which is compatible with the different voice gateway implementations. This "subset" technique can be used to achieve compatibility with a number of voice gateway implementations.

Figure 6:
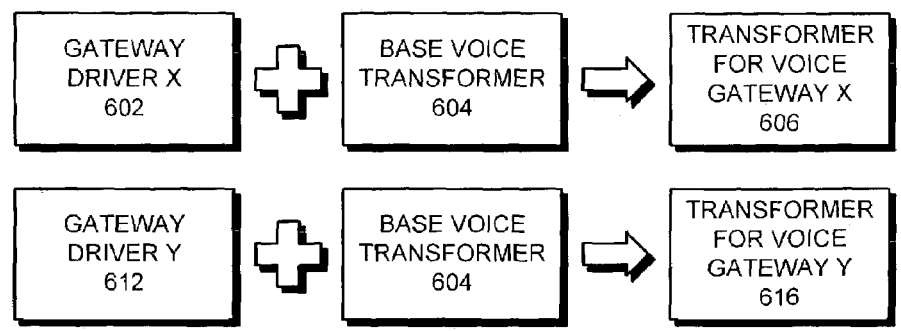
FIG. 6 illustrates how voice transformers are constructed in accordance with an embodiment of the present invention.

However, other voice gateway implementations remain incompatible even with a subset of SRGS. For these voice gateway implementations, the voice gateway provider can write a gateway-specific driver that can be incorporated into transformation framework 102. For example, referring to FIG. 6, a gateway driver X 602 can be added to a base voice transformer 604 to produce a gateway-specific transformer for voice gateway X 606. Similarly, a gateway driver Y 612 can be added to the base voice transformer 604 to produce a gateway-specific transformer for voice gateway Y 616.

Figure 7:
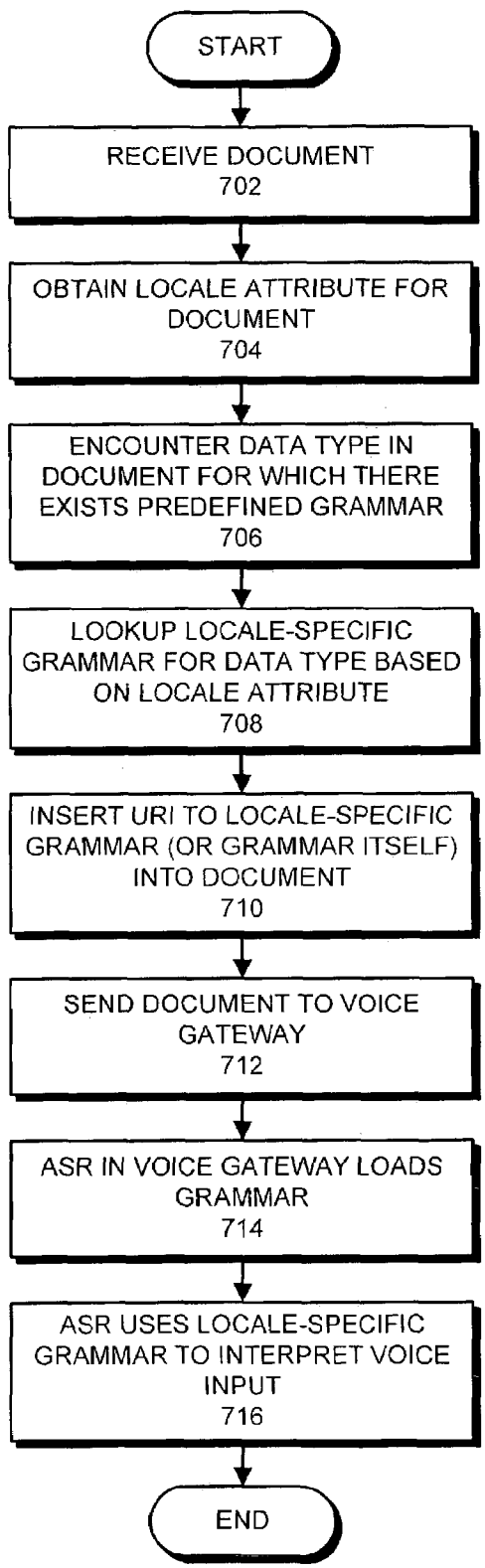
FIG. 7 presents a flow chart illustrating how the system is configured to receive voice input in accordance with an embodiment of the present invention.

FIG. 7 presents a flow chart illustrating how a system is configured to receive voice input in accordance with an embodiment of the present invention. The system starts by receiving a VoiceXML document 502 (step 702). Next, the system obtains a locale attribute for the document (step 704). In one embodiment of the present invention, this involves retrieving the locale attribute from VoiceXML document 502 itself. Note that it is possible to obtain this locale attribute from an eternal source outside of VoiceXML document 502.

Next, while scanning through VoiceXML document 502, the system encounters a datatype for which there exists a pre-defined grammar (step 706). The system then uses the locale attribute to look up a locale-specific grammar for the datatype (step 708). Next, the system inserts a URI 504 for the locale-specific grammar into VoiceXML document 502, wherein URI 504 can be used to determine a location for the grammar (step 710). Alternatively, the system can insert the locale-specific grammar itself into VoiceXML document 502.

Finally, the system sends VoiceXML document 502 to a voice gateway 106 (step 712). This causes ASR 204 within voice gateway 106 to load the locale-specific grammar (step 714). This allows ASR 204 to use the locale-specific grammar while subsequently interpreting voice input from a user (step 716).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating voice output for an application, comprising:

receiving a symbolic representation of a data item to be outputted from the application, wherein the symbolic representation is included in a locale-independent multi-channel markup language document, wherein receiving the data item includes receiving fields related to the data item, and wherein the fields are used to control the expansion of the data item;

obtaining a locale attribute that identifies a version of a language that is spoken in a locale, wherein the locale attribute is encoded in a voice extensible markup language document encoding the symbolic representation;

expanding the symbolic representation of the data item into a fully articulated locale-specific textual representation of the data item, wherein expanding the data item involves accepting the data item, the locale attribute, and the related fields, and generating the locale-specific textual representation of the data item as an output;

associating the textual representation of the data item with one or more audio files containing locale-specific voice output corresponding to the textual representation, wherein associating the textual representation of the data item with the audio files involves matching the largest possible substrings of the textual representation with corresponding audio files from a library; and outputting the audio files to a user.

2. The method of claim 1, wherein outputting the audio files to the user involves:

sending references to the audio files from an application server to a voice gateway; and allowing the voice gateway to output the audio files to the user.

3. The method of claim 1, further comprising:

receiving a voice input from the user; and interpreting the voice input using a locale-specific grammar.

4. The method of claim 1, wherein obtaining the locale attribute involves receiving the locale attribute as an application parameter.

5. The method of claim 1, wherein obtaining the locale attribute involves receiving the locale attribute as an application parameter associated with a particular user.

6. The method of claim 1, wherein the locale attribute includes:

a language code that identifies the language; and a region code that identifies a geographic region in which a locale-specific version of the language is spoken.

7. The method of claim 1, wherein the voice extensible markup language document contains:

a locale-independent representation of how voice output is to be presented to a user; and a locale-independent representation of how a voice input is to be received from the user.

8. The method of claim 7, wherein the method further comprises translating the multi-channel markup language document into the voice extensible markup language document;

wherein the multi-channel markup language document can also be translated into other markup languages, such as HyperText Markup Language (HTML).

9. A computer-readable storage device storing instructions that when executed by a computer cause the computer to perform a method for generating voice output for an application, the method comprising:

receiving a symbolic representation of a data item to be outputted from the application, wherein the symbolic representation is included in a locale-independent multi-channel markup language document, wherein receiving the data item includes receiving fields related to the data item, and wherein the fields are used to control the expansion of the data item;

obtaining a locale attribute that identifies a version of a language that is spoken in a locale, wherein the locale attribute is encoded in a voice extensible markup language document encoding the symbolic representation;

expanding the symbolic representation of the data item into a fully articulated locale-specific textual representation of the data item, wherein expanding the data item involves accepting the data item, the locale attribute, and the related fields, and generating the locale-specific textual representation of the data item as an output;

associating the textual representation of the data item with one or more audio files containing locale-specific voice output corresponding to the textual representation, wherein associating the textual representation of the data item with the audio files involves matching the largest possible substrings of the textual representation with corresponding audio files from a library; and outputting the audio files to a user.

10. The computer-readable storage device of claim 9, wherein outputting the audio files to the user involves:

sending references to the audio files from an application server to a voice gateway; and allowing the voice gateway to output the audio files to the user.

11. The computer-readable storage device of claim 9, wherein the method further comprises:

receiving a voice input from the user; and interpreting the voice input using a locale-specific grammar.

12. The computer-readable storage device of claim 9, wherein obtaining a locale attribute involves receiving the locale attribute as an application parameter.

13. The computer-readable storage device of claim 9, wherein obtaining the locale attribute involves receiving the locale attribute as an application parameter associated with a particular user.

14. The computer-readable storage device of claim 9, wherein the locale attribute includes:

a language code that identifies the language; and a region code that identifies a geographic region in which a locale-specific version of the language is spoken.

15. The computer-readable storage device medium of claim 9, wherein the voice extensible markup language document contains:

a locale-independent representation of how voice output is to be presented to a user; and a locale-independent representation of how a voice input is to be received from the user.

16. The computer-readable storage device of claim 15, wherein the method further comprises translating the multi-channel markup language document into the voice extensible markup language document;

wherein the multi-channel markup language document can also be translated into other markup languages, such as HyperText Markup Language (HTML).

17. An apparatus that generates voice output for an application, comprising:

a receiving mechanism configured to:

receive a symbolic representation of a data item to be outputted from the application, wherein the symbolic representation is included in a locale-independent multi-channel markup language document;

receive fields related to the data item for controlling expansion of the data item; and obtain a locale attribute that identifies a version of a language that is spoken in the locale, and wherein the locale attribute is encoded in a voice extensible markup language document encoding the symbolic representation;

an expansion mechanism configured to expand the symbolic representation of the data item into a fully articulated locale-specific textual representation of the data item, wherein the expansion mechanism is further configured to accept the data item, the locale attribute, and the related fields, and generate the locale-specific textual representation of the data item as an output;

an association mechanism configured to associated the textual representation of the data item with one or more audio files containing locale-specific voice output corresponding to the textual representation, wherein the association mechanism is configured to match the largest possible substrings of the textual representation with corresponding audio files form a library; and an output mechanism configured to output the audio files to a user.

18. The apparatus of claim 17, wherein the expansion mechanism and the association mechanism reside within an application server; and wherein the output mechanism resides within a voice gateway, which is configured to receive references to the audio filed from the application server, and to output the audio files to the user.

19. The apparatus of claim 17, further comprising a voice input mechanism configured to:

receive a voice input from the user; and to interpret the voice input using a locale-specific grammar.

20. The apparatus of claim 17, wherein the receiving mechanism is configured to obtain the locale attribute as an application parameter.

21. The apparatus of claim 17, wherein the receiving mechanism is configured to obtain the locale attribute as an application parameter associated with a particular user.

22. The apparatus of claim 17, wherein the locale attribute includes:

a language code that identifies the language; and a region code that identifies a geographic region in which a locale-specific version of the language is spoken.

23. The apparatus of claim 17, wherein the voice extensible markup language document contains:

a locale-independent representation of how voice output is to be presented to a user; and a locale-independent representation of how a voice input is to be received from the user.

24. The apparatus of claim 23, wherein the apparatus further comprises a translation mechanism configured to translate the multi-channel markup language document into the voice extensible markup language document;

wherein the multi-channel markup language document can also be translated into other markup languages, such as HyperText Markup Language (HTML).

25. A means for generating voice output for an application, comprising:

a receiving means for:

receiving a symbolic representation of a data item to be outputted from the application, wherein the symbolic representation is included in a locale-independent multi-channel markup language document, and receiving fields related to the data item for controlling expansion of the data item; and;

wherein the receiving means is configured to obtain a locale attribute that identifies a version of a language that is spoken in the locale, and wherein the locale attribute is encoded in a voice extensible markup language document encoding the symbolic representation;

an expansion means for expanding the symbolic representation of the data item into a fully articulated locale-specific textual representation of the data item, wherein the expansion means is further configured to accept the data item, the locale attribute, and the related fields, and generate the locale-specific textual representation of the data item as an output;

an association means for associating the textual representation of the data item with one or more audio files containing locale-specific voice output corresponding to the textual representation, wherein the association means is configured to match the largest possible substrings of the textual representation with corresponding audio files from a library; and an output mechanism for outputting the audio files to the user.

\* \* \* \* \*